United States Patent [19]

Cooper

[11] 4,313,135

[45] Jan. 26, 1982

[54] METHOD AND APPARATUS FOR PRESERVING OR RESTORING AUDIO TO VIDEO SYNCHRONIZATION

[76] Inventor: J. Carl Cooper, 1373 Sydney, Sunnyvale, Calif. 94087

[21] Appl. No.: 172,043

[22] Filed: Jul. 28, 1980

[51] Int. Cl.³ .............................................. H04N 5/04
[52] U.S. Cl. .................................................... 358/149
[58] Field of Search ............... 358/148, 149, 185, 186, 358/198; 360/36

[56] References Cited

U.S. PATENT DOCUMENTS 4,218,705  8/1980  Inaba et al. ......................... 358/149

Primary Examiner—John C. Martin
Attorney, Agent, or Firm—Michael L. Harrison

[57] ABSTRACT

The audio synchronizer includes a delay detector for measuring the video delay through a video processing system, such as one or more frame synchronizers, and a variable audio delay controlled by the detector so as to equalize the delays of the video and audio signals.

13 Claims, 2 Drawing Figures

4,313,135

METHOD AND APPARATUS FOR PRESERVING OR RESTORING AUDIO TO VIDEO SYNCHRONIZATION

BACKGROUND OF THE INVENTION

1. Field of the Invention

This invention relates to a method and apparatus for preserving or restoring audio to video synchronization, or lip sync, in television systems which use video processing devices such as frame synchronizers that generate large time delays in the video signals which are processed.

2. Description of the Prior Art

With the advance of television technology, and in particular the development of complex systems for processing the video portions of television signals, time delays of video signals which are passed through these processing systems are increasing to a point where a noticeable delay in said video signals with respect to their associated audio signals, (lip sync) can be generated. One typical situation where this problem may arise is in the transmission of network programming. Normally, network programming in some parts of the U.S. is relayed by microwave links from one station to the next in a serial fashion. It is not uncommon for the network program to pass through a string of ten or more stations. With the development of relatively low cost video frame synchronizers, it is possible that each of the stations in the string will pass the video portion of the network program through a synchronizer. Each synchronizer in the string will generate a delay in the video signal which can continuously vary from a minimum of several microseconds to a maximum of approximately 1/30 second. If ten synchronizers in the string were all at maximum delay a video delay of approximately ⅓ second is generated, which also causes a ⅓ second lip sync problem.

Normally, in electronic systems, the changes of delay times of associated signals can be compensated for by inserting fixed or manually adjustable delay devices in one of the signal paths, and there are several commercially available devices for delaying audio signals by fixed amounts. In the particular application of television systems, fixed or manually adjustable delays are unsuitable for insertion into the audio channel to restore preper video to audio synchronization, or lip sync, because in many instances the video delay through a particular processing device is constantly changing.

SUMMARY OF THE INVENTION

The audio synchronizer apparatus and method described herein provides a delay detector for measuring the video delay through a video processing system, which system may be made up of one or more video processing devices, such as frame synchronizers, and a variable audio delay controlled by said delay detector, to delay the associated audio signal by a corresponding amount of delay, with said delay detector and said variable audio delay operating in a continuous fashion.

Other objects and a fuller understanding of this invention may be had by referring to the following description and claims, taken in conjunction with the accompanying drawings.

DESCRIPTION OF THE PREFERRED EMBODIMENTS

Figure 1:
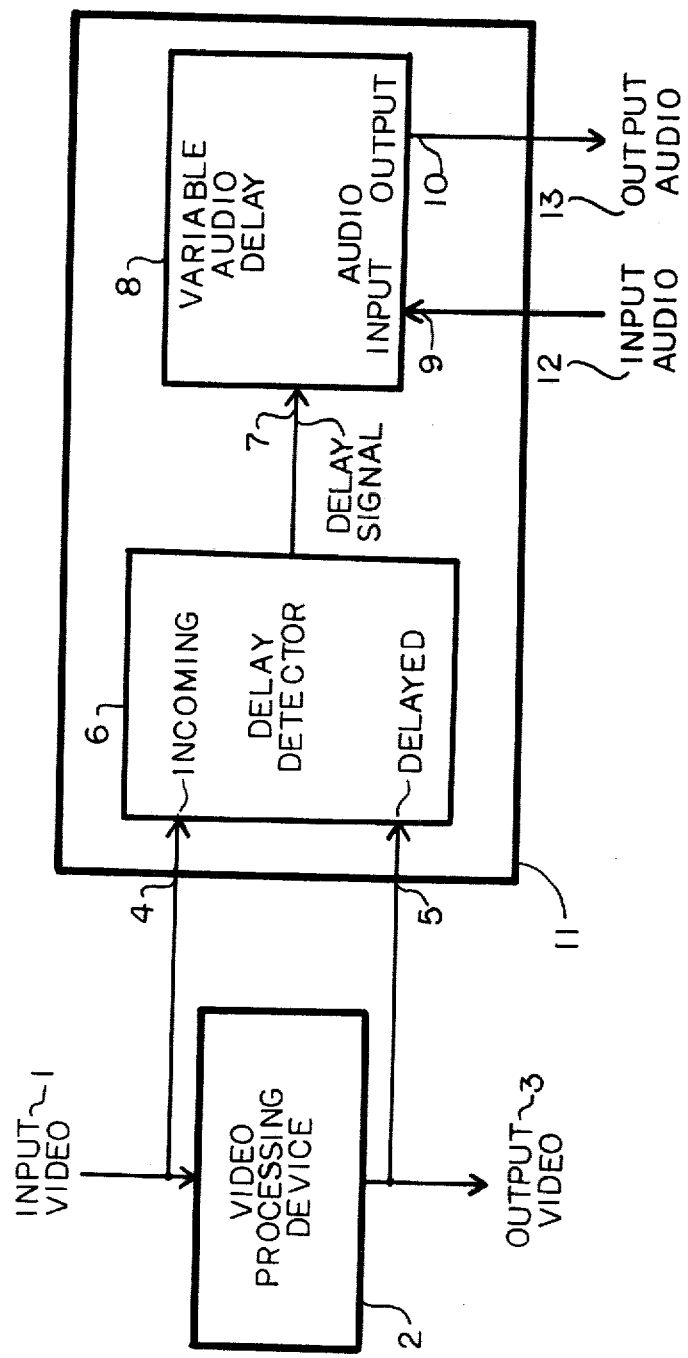
FIG. 1 is a block diagram of an audio synchronizer as it would be connected to a video processing device which is operated in a television system.

FIG. 1 is a block diagram of the audio synchronizer device, shown in a typical system configuration having an external video processing device 2 having an input video signal 1 and an output video signal 3 which device 2 is not a part of said audio synchronizer device, the audio synchronizer device 11 consisting of two video inputs, 4 for input video and 5 for output video, delay detector means 6 for detecting the delay of output video 3 with respect to input video 1, delay signal 7 which contains information of said delay of output video 3, variable audio delay 8 having audio input 9 and audio output 10 and responsive to delay signal 7.

Figure 2:
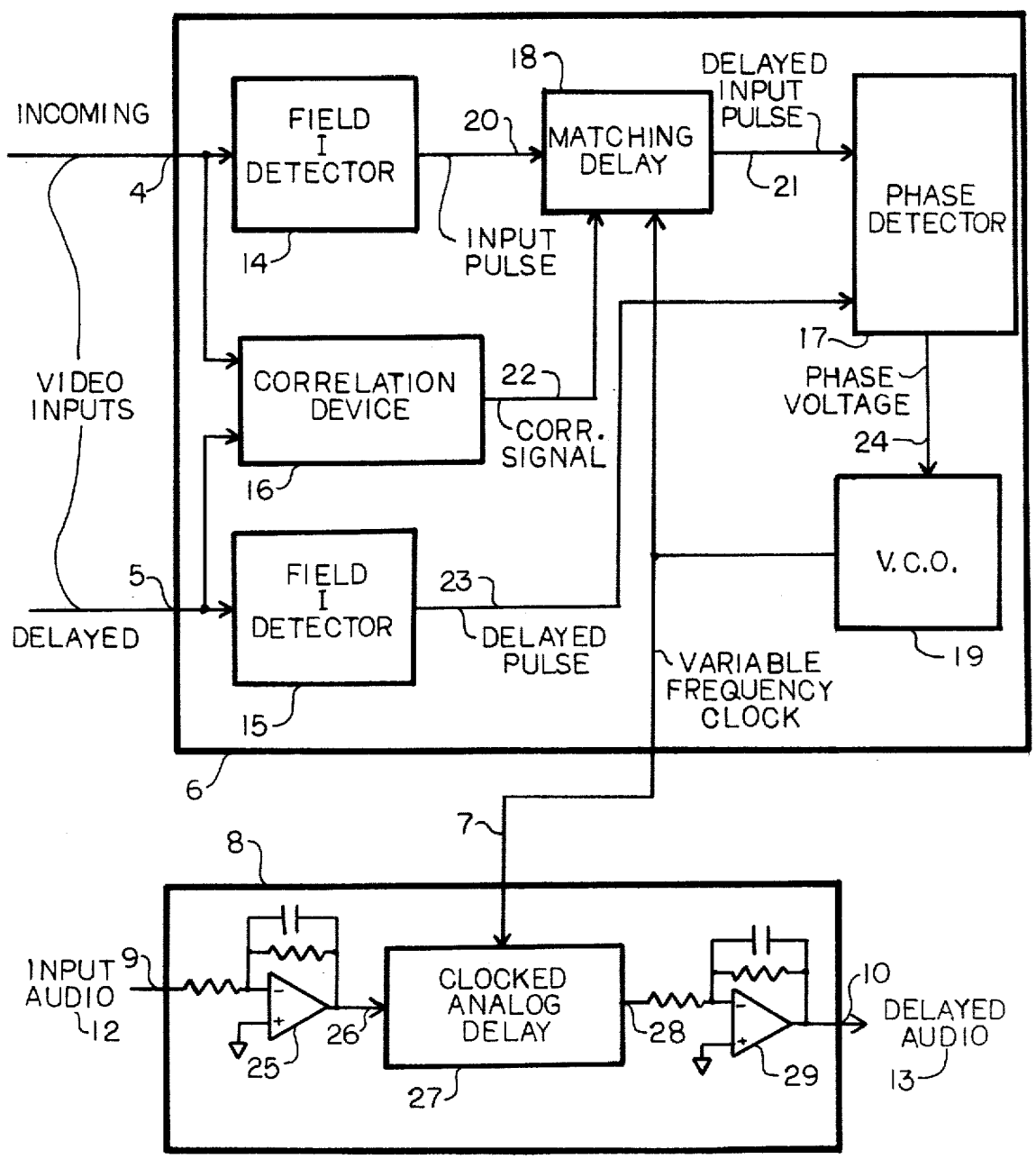
FIG. 2 is a block diagram of an audio synchronizer device showing the internal functions of the device.

FIG. 2 is a more detailed block diagram of the audio synchronizer device containing delay detector means 6 having video inputs 4 and 5, variable frequency clock 7 which is the delay signal 7 of FIG. 1, field I detectors 14 and 15 which generate input pulse 20 and delayed pulse 23, respectively, matching delay 18, having inputs of; input pulse 20, correlation signal 22, and aforementioned variable frequency clock 7 to provide delayed input pulse 21, correlation device 16 having inputs of input video 1 and output video 3, and outputting correlation signal 22 phase detector 17 having delayed input pulse 21 and delayed pulse 23 as inputs to provide phase voltage 24 to the voltage controlled oscillator (V.C.O.) 19 which generates the aforementioned variable frequency clock 7, variable audio delay 8 having inputs variable frequency clock 7 and audio input 9, buffer amplifier and low pass filter 25 providing buffered audio 26 to clocked analog delay 27 which delays buffered audio by a delay time controlled by variable frequency clock 7 to provide delayed audio 28 to buffer amplifier and low pass filter 29 which provides delayed audio 13 at audio output 10.

In operation, input video applied at 4 is applied to field I detector 14 and correlation device 16. Field I detector 14 detects the starting of color field I of input video 1, which in NTSC television corresponds to the odd numbered scan lines having a positive color subcarrier phase. This relationship occurs every four fields in the NTSC system. In European PAL systems this occurs every eight fields and the color field I detector may be changed to detect either NTSC or PAL, or any other television system currently in use in the world. Currently there are several integrated circuits such as the National TBA 920 which closely approximate this function, and the construction of a proper color field I detector is elementary to one skilled in the art and will not be discussed extensively. At the start of the aforementioned color field I, a pulse, input pulse 20, is output from the field I detector 14. The input pulse identifies the occurance of and is coincident with the start of color field I. Field I detector 15 which is responsive to output video applied at 5 operates in a manner identical to 14 to provide delayed pulse 23 which is the same as input pulse 20 except that 23 corresponds in time to output video applied at 5. Alternately said field I detectors 14 and 15 and correlation device 16 (discussed later) may be part of external video processing device 2 since these functions are often provided as part of the operation of such devices. Input pulse 20 is input to matching delay 18 which matching delay is composed of a serial shift register device having N and P sections, which sections are clocked in unison by variable frequency clock 7. Input pulse 20 may be clocked through both sections giving a delay of N plus P clocks or through only one section giving a delay of N clocks. It will be assumed for clarity that matching delay 18 is a single serial shift register whose length is electronically changeable to a length of N or N plus P by correlation signal 22. A typical serial shift register whose length may be electronically changed is the National MM 5104. Reference to the National Literature for this part will aid in understanding the switchable length concept. The time delay which is applied to input pulse 20 is defined by $(1/f)(N+P)$ where f is the frequency of 7 and P may be considered to be 0 if the second shift register section is unused. Delayed pulse 23 which is output from 15 is input to phase detector 17. Also input to phase detector 17 is delayed input pulse 21. Phase detector 17 outputs a phase voltage 24 which contains information of the phase between 21 and 23. Since 21 and 23 are both periodic signals the phase relationship between 21 and 23 corresponds to the delay of 23 with respect to 21. In a particular embodiment of 17 a conventional ramp generator with a sample and hold circuit may be used. The voltage ramp is reset and restarted by 23 and the ramp is then sampled at a fixed delay time after 21 occurs and the voltage at the sample point held. The aforementioned voltage will correspond directly to the phase, or the time delay between 23 and 21, said voltage is integrated and output thus providing phase voltage 24, said phase voltage being negative if 21 leads 23, 0 if 21 is coincident with 23 and positive if 21 lags 23. Phase voltage 24 is input to a voltage controlled oscillator 19. Said voltage controlled oscillator is reponsive to 24 to provide said variable frequency clock 7. In operation, if 21 leads 23 in phase the frequency of the oscillator will decrease, if 21 is coincident with 23 the oscillator frequency will be constant and if 21 lags 23 the frequency of the oscillator will increase. Phase detector 17 and voltage controlled oscillator 19 are basic circuits to a phase locked loop. These functions are combined on many commercially available IC's such as the Signetics 562 which may be used in this device. Reference to the manufacturer's literature will provide a further understanding of the phase detector and voltage controlled oscillator functions, as well as the overall phase locked loop concept utilized as the heart of the delay detector. Variable frequency clock 7 is input to matching delay 18, thus completing a closed loop, which operates as a classic phase locked loop. The net effect of the loop is to adjust the frequency of the voltage controlled oscillator 19 and thus the delay of matching delay 18 so that delayed input pulse 21 will always be in phase with delayed pulse 23. Variable frequency clock 7 is also applied to variable audio delay 8 at clocked analog delay 27. Clocked analog delay 27 delays the buffered audio signal 26 by an amount which is proportional to the frequency of 7, said proportional amount being the same delay as that of said serial shift register of matching delay 18, assuming 18 has the same number of sections as clocked analog delay 27. In a particular application, 27 may be constructed of an analog bucket brigade, utilizing change coupled technology, having Y sections, which is the analog equivalent of a serial shift register.

A Fairchild CCD 321A-4 is suitable for this purpose, and functions in a manner similar to digital serial shift registers. It can be shown that if $Y=N$ the delay through said serial shift register of 18 will equal the delay through said analog bucket brigade device of 27, if input pulse 20 is not passed through aforementioned P sections of 18. The net result is that the analog delay which is generated in 27 is the same as the delay necessary to make input pulse 20 coincident with output pulse 23, thus making the analog delay equal to the delay through said external video processing device 2, and audio which is input at 9 will be output at 10 with a delay equal to that of said video processing device 2, thus preserving the lip sync of the television signal. The requirement for correlation device 16 arises from a characteristic of some video processing devices known as "hysteresis". In the normal function of video frame synchronizers, incoming video is converted to digital, written into a digital memory and read out of memory at the proper time in order that the video information will be properly synchronized to an external reference. The function of the video frame synchronizer is such that it may be modeled as a continuously variable delay line whose time delay is changed to provide proper synchronization of video to an external source. If incoming video is only slightly advanced with respect to the reference that it is to be synchronized to, synchronization can be achieved with a delay matching the slight advance, or delay of 1 frame plus the slight advance. In the case of the video synchronizer the delay which is used will often be the longer, or one frame plus a small amount. The reason this is used relates to a requirement for proper processing of video signals having time base errors, and is not important to the understanding of this disclosure, as long as one understands that this delay situation can happen. If one inspects the operation of the delay detector 6, without considering correlation device 16, it will be found that for the situation described above where the video processing device may have a delay of a small amount, or one frame plus a small amount, the delay detector will be unable to distinguish between the two situations and will output a signal which corresponds to the shorter delay. It is the function of the correlation device to determine which of the above delay conditions exists by inspecting both input video 1 and output video 3. In the situation where the delay through the video processing device is small, there will be a high temporal correlation between the two signals, if the delay is approximately a frame, the temporal correlation will be much lower. For the case of low correlation, the correlation device 16 outputs a correlation signal 22 which causes the previously discussed delay section P to be included in the matching delay 18. This will cause the phase detector to detect a large phase error which is required for proper audio delay. For situations where hysteresis mode is not entered, and only a small delay is generated in the video processing device, the correlation device will detect a high correlation, and cause delay section P to be deleted from matching delay 18, thus generating proper phase detection for generating a small audio delay. The correlation device operates internally to determine the difference between the input video 1 and output video 3 as measured at several points within the active video portion of the television frame. In a particular embodiment, each signal is sampled and the value stored, as in a sample and hold circuit, at the exact center of several active video lines. The line samples are subtracted, i.e.

the sample from line number X from input video 1 is subtracted from the sample from X of output video 3. The absolute value of this difference is a measure of the correlation between the two video signals at the middle of line X. The sample and hold and subtract functions are then performed for line X+1, X+2 etc. The absolute value of the differences for a number of lines is averaged, thus giving a voltage which is proportional to the correlation between the two video signals. This voltage is then passed through a level detector to provide a switched correlation signal 22. In practice, the National LH0023 sample and hold and LM 741 OP amp are suitable components for use in the correlation device circuit. Timing of the sample point is achieved by one shot devices such as the 74123 which are triggered from horizontal and vertical sync which is stripped off of each video signal. Typical circuits for sample and hold, subtraction, absolute value and integration can be found in many linear applications handbooks published by I.C. manufacturers. The correlation device does have shortcomings in that it does not work as well for static video signals, as it does for video signals having a lot of movement. Nevertheless if proper care is taken in alignment of the sample and hold, and difference circuits, the temporal noise which is present on all video signals provides sufficient frame to frame difference to allow proper operation.

Although this invention has been described in its preferred form with a certain degree of particularity, it is understood that the present disclosure of the preferred form has been made only by way of example and that numerous changes in the details of construction and the combination and arrangement of parts may be resorted to as well as combination of functions within or as part of other devices, without departing from the spirit and the scope of the invention as hereinafter claimed.

What is claimed is:

1. Apparatus for maintaining correct audio to video timing relationship in a television system, comprising a delay detection circuit to measure the delay through at least one external video device, and variable audio delay circuit controlled by said delay detection circuit to provide an audio delay equal to the delay through said video device.

2. Apparatus as claimed in claim 1 wherein said delay detection circuit has as one input the video which is input to said external video device and has as a second input the video which is output from said external video device.

3. Apparatus as claimed in claim 2 wherein said delay detection circuit and said variable audio delay circuit operate continuously to automatically adjust to a changing delay in said external video device.

4. Apparatus as claimed in claim 2 wherein said audio delay circuit utilizes a delay that is a clocked analog shift register.

5. Apparatus as claimed in claim 4 wherein audio delay time is controlled by changing the frequency of the clocking signal to said analog shift register.

6. Apparatus as claimed in claim 2 wherein said delay detection circuit utilizes a phase lock loop and a correlation circuit as part of said circuit to measure the delay through said external video device.

7. Apparatus as claimed in claim 1 wherein said delay detection circuit has inputs of at least one signal output from said external video device.

8. Apparatus as claimed in claim 1 with parts of said delay detection circuit being provided by functions within said external video device.

9. Apparatus for correcting or maintaining correct audio to video timing relationship of a television signal by delaying said audio by an amount approximately equal to the amount of delay generated in said video by an external video device which apparatus contains a variable audio delay circuit including a clocked analog delay line, a delay detection circuit which changes the frequency of the clock to said analog delay line to control the delay of said analog delay circuit, with said delay detection circuit having as one input video which is input to said external video device and having as a second input video output from said video device.

10. Apparatus as claimed in claim 9 including a correlation circuit as part of said delay detection circuit.

11. The method for delaying an audio signal in response to the delay of a video signal through an external video device, including the steps of measuring the difference of video input to said external device and video output from said external device to determine the delay through said external device, and the step of adjusting the delay of an audio delay circuit to match said delay through said external device to maintain correct audio to video timing relationship.

12. The method of claim 9 wherein the step of determining the delay through said circuit operates continuously to automatically adjust to changes in the delay through said external device.

13. The method of delaying an audio signal in response to the time delay of an associated video signal through video circuitry, including the steps of comparing said video signal which is input to said video circuitry to the video signal which is output from said video circuitry, and automatically changing the audio delay of an audio delay circuit in order to match said time delay to maintain proper timing of said output video signal to the audio signal which is output from said audio delay device.

* * * * *